(12) United States Patent
Shen

(10) Patent No.: US 8,601,547 B1
(45) Date of Patent: Dec. 3, 2013

(54) COOKIE-BASED DETECTION OF SPAM ACCOUNT GENERATION

(75) Inventor: HongHai Shen, Los Altos Hills, CA (US)

(73) Assignee: Google Inc., Mountain View, CA (US)

( * ) Notice: Subject to any disclaimer, the term of this patent is extended or adjusted under 35 U.S.C. 154(b) by 359 days.

(21) Appl. No.: 12/648,251

(22) Filed: Dec. 28, 2009

Related U.S. Application Data

(60) Provisional application No. 61/141,204, filed on Dec. 29, 2008.

(51) Int. Cl.
*G06F 7/04* (2006.01)
*G06F 17/30* (2006.01)

(52) U.S. Cl.
USPC ............. 726/4; 726/1; 726/2; 726/3; 726/5; 726/6; 726/7; 726/22; 726/23; 726/25; 726/27; 726/28; 726/29; 713/161; 713/165; 713/170; 713/183

(58) Field of Classification Search
USPC ........................................... 726/4, 26
See application file for complete search history.

(56) References Cited

U.S. PATENT DOCUMENTS

| | | | |
|---|---|---|---|
| 7,006,993 B1 * | 2/2006 | Cheong et al. ............... 705/38 |
| 7,117,528 B1 | 10/2006 | Hyman et al. | |
| 7,337,324 B2 * | 2/2008 | Benaloh et al. .............. 713/182 |
| 7,606,918 B2 * | 10/2009 | Holzman et al. ............. 709/229 |
| 7,657,935 B2 | 2/2010 | Stolfo et al. | |
| 7,725,421 B1 | 5/2010 | Gedalius et al. | |
| 7,877,800 B1 * | 1/2011 | Satish et al. ................. 726/22 |
| 7,899,759 B1 * | 3/2011 | Heggem ........................ 705/500 |
| 8,069,210 B2 * | 11/2011 | Gillum et al. ................. 709/206 |
| 8,131,685 B1 * | 3/2012 | Gedalius et al. ............. 707/662 |
| 2004/0249789 A1 | 12/2004 | Kapoor et al. | |
| 2005/0076230 A1 * | 4/2005 | Redenbaugh et al. ........ 713/200 |
| 2006/0149820 A1 | 7/2006 | Rajan et al. | |
| 2006/0168006 A1 | 7/2006 | Shannon et al. | |
| 2007/0100929 A1 | 5/2007 | DeRobertis et al. | |
| 2007/0208868 A1 | 9/2007 | Kidd et al. | |
| 2008/0034424 A1 * | 2/2008 | Overcash et al. ............ 726/22 |
| 2008/0244021 A1 * | 10/2008 | Fang ............................ 709/206 |
| 2009/0044264 A1 * | 2/2009 | Ramanathan et al. ........ 726/14 |
| 2009/0204820 A1 | 8/2009 | Brandenburg et al. | |
| 2009/0241174 A1 | 9/2009 | Rajan et al. | |
| 2009/0300720 A1 * | 12/2009 | Guo et al. ..................... 726/3 |
| 2009/0307313 A1 | 12/2009 | Wang et al. | |
| 2009/0319271 A1 * | 12/2009 | Gross ........................... 704/246 |
| 2009/0319274 A1 | 12/2009 | Gross | |
| 2009/0328163 A1 * | 12/2009 | Preece .......................... 726/5 |

(Continued)

*Primary Examiner* — Edan Orgad
*Assistant Examiner* — Jenise Jackson
(74) *Attorney, Agent, or Firm* — Troutman Sanders LLP; James E. Schutz; Warren Thomas

(57) ABSTRACT

A computer implemented method for detecting and preventing spam account generation is disclosed. Upon receiving an account creation request from a client, the server analyzes the request and associates a spam score with the account creation request, based at least in part on a number of new account requests associated with the cookie received during a predefined time period, and compares the spam score with certain predefined thresholds. If the spam score is above a first threshold, the server may refuse the account creation request. If the spam score is within a certain range, the server may limit the access to the account associated with the account creation request. If the spam score is below a second threshold, the server may put no limit on access to (i.e., enable normal use of) the account.

18 Claims, 10 Drawing Sheets

(56) References Cited

U.S. PATENT DOCUMENTS

| | | |
|---|---|---|
| 2010/0077040 A1 | 3/2010 | Hariharan et al. |
| 2010/0077043 A1 | 3/2010 | Ramarao et al. |
| 2010/0115040 A1 | 5/2010 | Sargent et al. |
| 2010/0287484 A1 | 11/2010 | Ruiz |
| 2010/0299326 A1* | 11/2010 | Germaise .................. 707/728 |
| 2011/0214169 A1* | 9/2011 | Pinkas et al. .................. 726/7 |

* cited by examiner

|                      |                                      |           |
|----------------------|--------------------------------------|-----------|
| First name:          | John                                 | 504       |
| Last name:           | Smith                                | 506       |
| Desired Login name:  | john2007                             | @gmail.com 508 |
|                      | Check availability — 510             |           |
| Choose a password:   | *******                              | 512       |
| Re-enter password:   | *******                              | 514       |
| Security Question:   | What was your first phone number     | 516       |
| Answer:              | 650-555-1212                         | 518       |
| Secondary email:     | john2006@gmail.com                   | 208-N     |
| Location:            | United States                        | 520       |

502 ← 500

Terms of Service: Please check the Google Account information you've entered above (feel free to change anything you like), and review the Terms of Service below.

522 —
Google Terms of Service for your Personal Use

Welcome! By using Google's search engine or other Google services ("Google Services"), you agree to be bound by the By clicking on 'I accept' below you are agreeing to the Terms of Service above and both the Program Policy and the Privacy Policy.

I accept. Create my account. — 524

Figure 5

COOKIE-BASED DETECTION OF SPAM ACCOUNT GENERATION

RELATED APPLICATIONS

This application claims priority under 35 U.S.C. 119 to U.S. provisional application 61/141,204 "IP Address Based Detection of Spam Account Generation," filed Dec. 29, 2008, which is hereby incorporated by reference in its entirety.

This application is related to U.S. patent application Ser. No. 12/648,246, "IP Address Based Detection of Spam Account Generation,", filed on Dec. 28, 2009, which is hereby incorporated by reference in its entirety.

This application is related to U.S. patent application Ser. No. 12/648,258, "Password Popularity-Based Limiting of Online Account Creation Requests,", filed on Dec. 28, 2009, which is hereby incorporated by reference in its entirety.

TECHNICAL FIELD

The disclosed embodiments relate generally to the creation of new user accounts for online services and, in particular, to methods and systems for detecting and preventing spam account generation.

BACKGROUND

Users of the Internet may register for online user accounts for many different purposes. However, certain users register for and create multiple new accounts (e.g., with an online or web based service) with or without an actual human user being involved. Such accounts may be used for sending unsolicited electronic communications known as spam.

SUMMARY

A computer implemented method for detecting and preventing spam account generation is disclosed. Upon receiving an account creation request from a client, the server analyzes the request and associates a spam score with the account creation request, based at least in part on a number of new account requests associated with the cookie received during a predefined time period, and compares the spam score with certain predefined thresholds. If the spam score is above a first threshold, the server may refuse the account creation request. If the spam score is within a certain range, the server may limit the access to the account associated with the account creation request. If the spam score is below a second threshold, the server may put no limit on access to (i.e., enable normal use of) the account.

BRIEF DESCRIPTION OF THE DRAWINGS

The aforementioned features and advantages as well as additional features and advantages will be more clearly understood with reference to the detailed description below in conjunction with the drawings.

FIG. 5 is an illustration of a GUI showing an example of an account creation form according to some embodiments.

Like reference numerals refer to corresponding parts and operations throughout drawings.

DESCRIPTION OF EMBODIMENTS

Reference will now be made in detail to embodiments, examples of which are illustrated in the accompanying drawings. While the invention will be described in conjunction with the embodiments, it will be understood that the invention is not limited to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

As used herein, "spamming" is the abuse of electronic systems to generate "spam." Spam may include excessive postings and unsolicited communications, such as email, instant messages (IMs), text messages, faxes, advertisements, repetitive posts, forgeries, or the like. In some cases, spam may include electronic communications in violation of the United States CAN-SPAM Act of 2003 or the Junk Fax Prevention Act of 2005. A "spammer" is an entity that engages in spamming.

Figure 1:
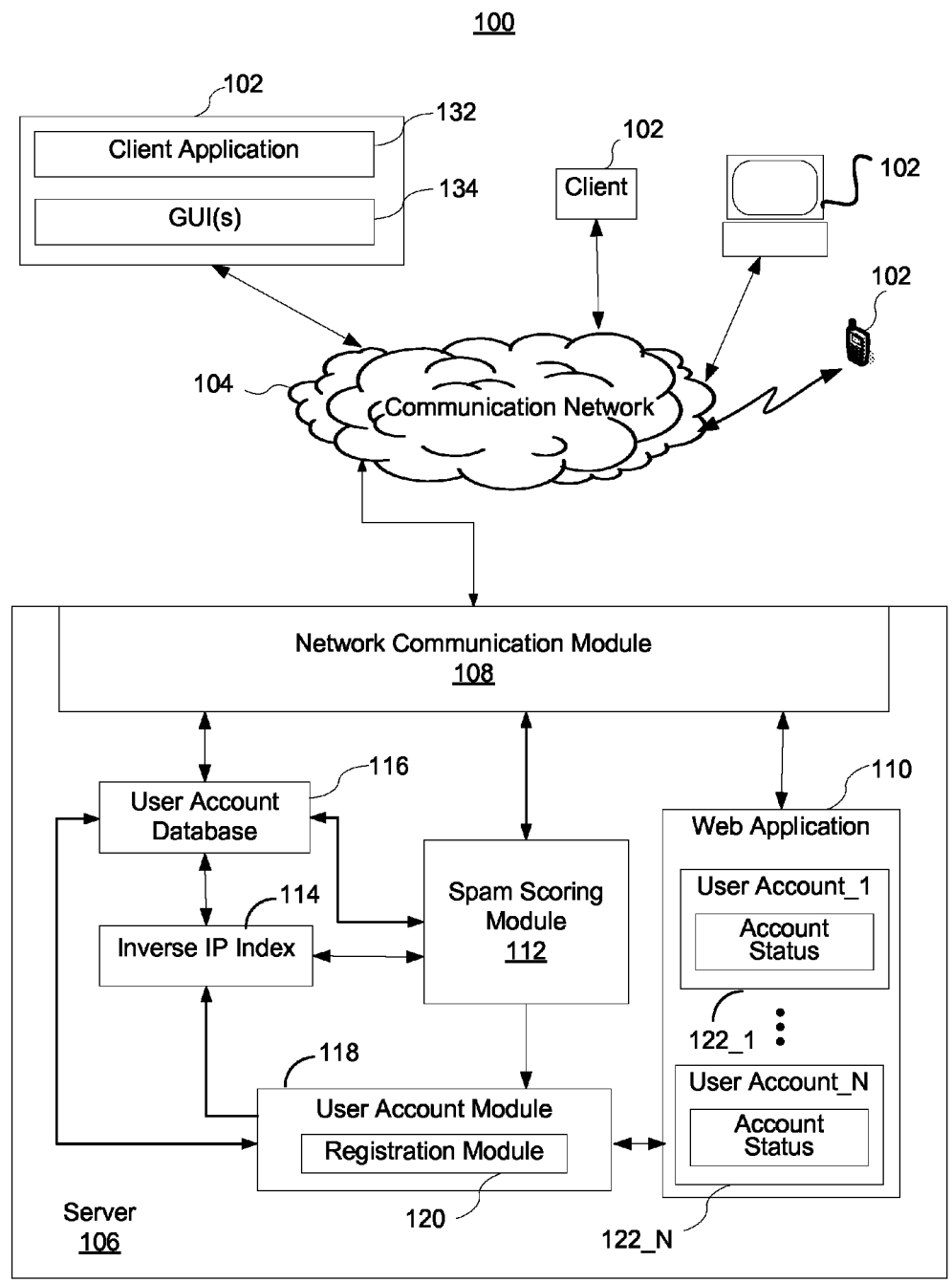
FIG. 1 is a diagram of an environment for detecting spam accounts (e.g., email accounts used for sending spam) for online services according to some embodiments.

FIG. 1 is a diagram of a distributed computer system 100 (also called an environment) in which embodiments of the present invention may be practiced. The distributed system includes a server 106 (also known as a server system, since it include multiple servers) that is configured to detect spam accounts (i.e., user accounts created or used for sending spam), as described in more detail below. The server 106 and one or more clients, computers, or devices 102 (hereinafter "clients") are connected to a communication network 104.

The communication network 104 can be any wired or wireless local area network (LAN) and/or wide area network (WAN), such as an intranet, an extranet, or the Internet. It is sufficient that communication network 104 provides communication capability between clients 102 and server 106. In some embodiments, HyperText Transport Protocol (HTTP) and the Transmission Control Protocol/Internet Protocol (TCP/IP) are used to transport requests, replies, messages, data and other communications across the communication network 104. The various embodiments, however, are not limited to the use of any particular protocol.

Each client 102 connected to communication network 104 may be identified by an IP address. As used herein, "IP address" includes an identifier and locator of a client within the communication network, and is not limited to the use of any particular protocol. The term "resource" as used throughout this specification refers to a unit of information or a service that is accessible via a Uniform Resource Locator (URL) and can be, for example, a webpage, a document, a database, an image, a computational object, a search engine, a web application, an online information service, or the like.

A respective client 102 can be any of a number of devices (e.g., a computer, an internet kiosk, a personal digital assistant, a cell phone, a gaming device, a desktop computer, or a laptop computer) and can include a client application 132 and/or client memory (not shown). Client memory can store information such as resources, system information, and/or information about a user. The client application 132 can be an application that permits a user to interact with the client and/or network resources to perform one or more tasks. For example, the client application 132 can be a browser (e.g., the computer program available under the trademark Firefox®) or other type of application that permits a user to search for, browse, and/or use resources. Client application 132 can provide a window to be displayed on a display device (e.g., a monitor) for rendering information sent by the server 106 as well as information entered by a user of the client 102. In some embodiments, the client application 132 may provide a graphical user interface (GUI) 134 for displaying information. A user may submit an account creation request through client application 132 to the server 106 to register for a new account (sometimes called an online account) for one or more online services. As used herein, a user includes any entity capable of using client 102 and/or client application 132 to create or access an account. Users may be humans, computer programs such as bots, or the like.

Depending on the context, the term "website" as used in this document refers to a logical location (e.g., an Internet or intranet location) identified by a URL, or it refers to a web server hosting the web site represented by the URL. For example, some "websites" are distributed over multiple Internet or network locations, but have a shared web server hosting those locations, and in many situations it is logical to consider those network locations to all be part of "a website."

In some embodiments the server 106 includes a network communication module 108, a web application 110, a spam scoring module 112, an inverse IP index 114, a user account database 116, and a user account module 118. The user account module 118 includes a registration module 120. As used herein, the terms "module," "procedure," and "application" correspond to instructions, executable by the one or more processors in a computer system, for performing one or more functions. These instructions need not be implemented as separate software programs, procedures or modules. The various modules and sub-modules may be rearranged, separated, and/or combined. The server 106 may include additional modules and/or sub-modules, or fewer modules and/or sub-modules than indicated in FIG. 1. For example, the spam scoring module 112 may be integrated with the user account module 118. Further, various modules and sub-modules of server 106 may be distributed on one or more other servers.

The network communication module 108 receives requests from respective clients 102 and returns resources, responses, and other information to the requesting clients 102 via communication network 104. For example, network communication module 108 receives user account creation requests from clients 102. A respective user account creation request (sometimes called a user account request, account request, or account creation request) is passed by network communication module 108 to user account module 118. In some embodiments, user account module 118 makes one or more procedure calls to spam scoring module 112 to determine how to handle the user account request. In some other embodiments, the user account request is passed to user account module 118 via spam scoring module 112.

Spam scoring module 112 assigns one or more scores to each user account and/or a user account request, such as a user account request to access web application 110. In some embodiments, the scores indicate the likelihood that a user account is used to generate spam. In some embodiments, the scores indicate the likelihood that a user account will be used to generate spam. In some embodiments, the scores indicate the likelihood that an account creation request is associated with spam.

Registration module 120 allows users to register for corresponding user accounts (122-1 through 122-N) allowing access to the web application 110. In the example shown in FIG. 1, there are N user accounts, where N is an integer that changes over time as new user accounts are generated. To illustrate one aspect of the operation of the server 106, we consider what happens when a client 102 associated with a respective user sends an account creation request to server 106 via communication network 104. The account creation request is received at server 106 by network communication module 108 and is directed to registration module 120. As discussed further in reference to FIG. 3A, in some embodiments, the account creation request is directed to registration module 120 only upon meeting some predefined criteria. The account creation request includes a set of account creation parameter values. Optionally, the account creation request optionally includes an account creation form and/or parameter values obtained from an account creation form.

In some embodiments, each account creation request from a user is communicated to and stored in user account database 116. Optionally, user account database 116 stores additional information such as login information, for example user name and password, user payment information (such as credit card information), and the like. Optionally, if the account creation request is accepted, registration module 120 sends an account creation notice through communication network 104 to requesting client 102. If the request is refused, registration module 120 may send an account refusal notice through communication network 104 to requesting client 102. Alternately, if the account creation request is refused, registration module 120 may perform other actions (e.g., one or more of: failing to send a response to the request, requiring the requesting client to respond to one or more additional human interaction proof (HIP) challenges, increasing the response time to the requesting client 102 (e.g., from one second to one minute or longer)) to discourage the client from sending additional account creation requests.

Web application 110 provides online services to users of clients 102 having user accounts. For example, the web application 110 may be an online calendar service, financial services application, a retail or wholesale product sales application, a social networking application, an email application, a blogging application, or any other online service or application (or set of applications) associated with user accounts. In some embodiments, multiple user accounts for one or more online services may be associated with a single originating user account.

Also shown in FIG. 1 is inverse IP index 114, which stores data regarding the user accounts in records associated with respective IP addresses, including the number of user accounts associated with each IP address. Inverse IP index 114 is further discussed with reference to FIG. 2.

In some embodiments, fewer and/or additional modules, functions or databases are included in server 106. The modules shown in FIGS. 1 and 7 as being part of server 106 represent functions performed in exemplary embodiments. Although FIGS. 1 and 7 portrays discrete functional elements (e.g., modules and data structures), these figures are intended more as a functional description of some embodiments of the invention rather than a structural description of the functional elements. One of ordinary skill in the art will recognize that an implementation might group or split the functional elements among various components. For instance, in some embodiments, the user account database 116 may be implemented using one or more other servers whose primary function is to store and process user information. In some embodiments, the user account database 116 and the inverse IP index 114, shown separately in FIG. 1 may be implemented by one, two, or more distinct databases spread over as many servers as needed to store and provide timely access to data in the databases.

Figure 7:
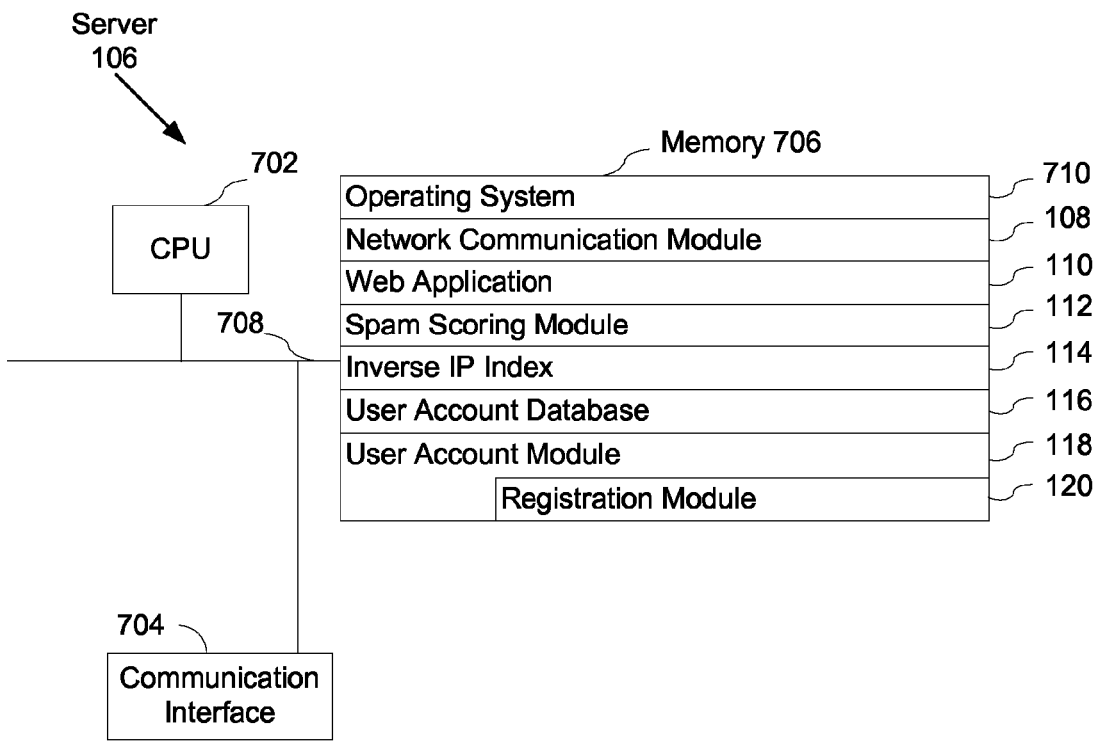
FIG. 7 is a block diagram of a server according to some embodiments.

It should be appreciated that the layout of the server 106 as shown in FIGS. 1 and 7 is merely exemplary and may take on any other suitable layout or configuration. The actual number of computers constituting the server 106 and the allocation of features among the computers may vary from one implementation to another, and may depend in part on the amount of traffic that the server 106 handles during peak usage periods as well as during average usage periods. Moreover, one or more of the modules or components in FIG. 1 may be implemented on one or more servers designed to provide the described functionality.

Figure 2:
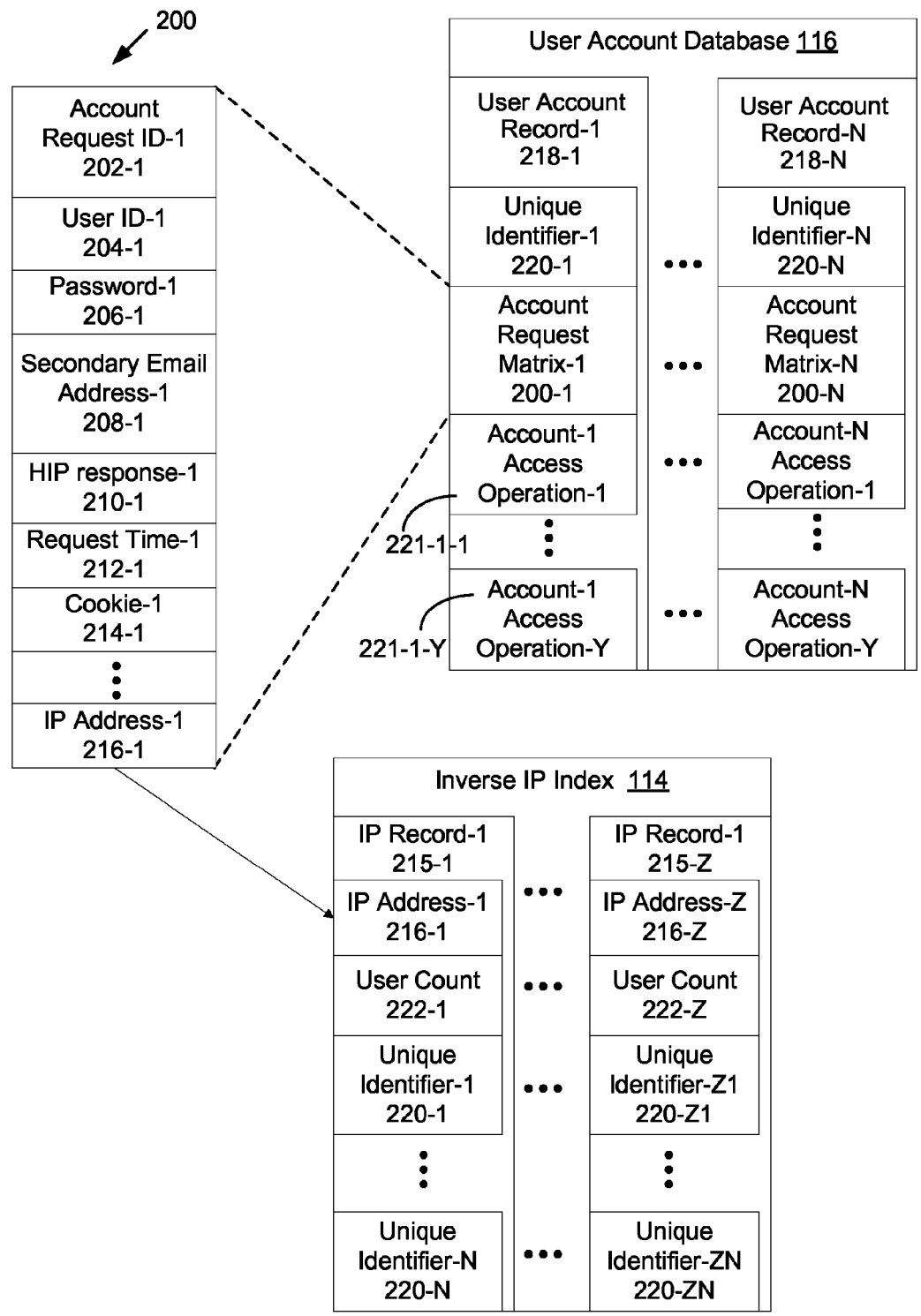
FIG. 2 is a block diagram illustrating data structures according to some embodiments.

FIG. 2 is a block diagram illustrating data structures stored in user account database 116 and inverse IP index 114 according to some embodiments. The data structures shown are by way of example and different data structures known to those skilled in the art may be used in some embodiments.

As shown in FIG. 2, user account database 116 stores multiple user account records 218. In some embodiments, a user account record 218 includes a unique identifier 220, such as the user ID 204 for the associated user account, an account request matrix 200 and a information 221 (e.g., record 221-1-Y for operation Y on user account 1) regarding each account access operation associated with the user account. Examples of account access operations that may be recorded in the user account record 218 for a respective account include user login to the account, sending an email message, opening an email message received by the account, changing the password for the account, logging out of the account, and adding or deleting services to the account. In the example shown in FIG. 2, each user account record 218-1 . . . 218-N includes the corresponding user ID 204-1 . . . 204-N, the corresponding account request matrix 200-1 . . . 200-N, and a record of each account access operation 1 . . . Y associated with the respective user account. To state the obvious, it is noted that different numbers of operations (Y) will be performed in each of the accounts. In some embodiments, the record 221 of each account access operation may include an access time, an access type (e.g., sending an email message, etc.), and an IP address entry identifying the IP address from which the account access operation was performed.

An account request may be processed and the associated information is stored in the account request matrix 200. Account request matrix 200 in FIG. 2 stores information for a single account request (e.g., account request-1, having a request identifier 202-1). In some embodiments, each user account record 218 is associated with no more than one account creation request, in which case the account request matrix 200 has only one column. Although not shown in FIG. 2, account request matrix 200 may alternatively include multiple columns associated with separate account requests associated with an originating account. For example, the originating account may be associated with an email account having a secondary email address 208. Optionally, the account request matrix 200 includes a unique request identifier 202 for each account request and includes a user ID 204, a password 206 (or hash of the password), an optional secondary email address 208, a human interaction proof (HIP) response 210 (described below), a request time 212, a cookie 214, and an IP address 216 associated with the account request. A secondary email address 208 is an email address associated with the account request but distinct from the email address of the new account.

In other embodiments, the account request matrix 200 includes a subset of the aforementioned fields, and may include additional fields as well. For example, a respective account request matrix 200 may not include a secondary email address. Optionally, account request matrix 200 includes a timestamp indicating when an account creation form was sent to client 102 by server 106. In some embodiments, user ID 204, password 206, secondary email address 208, and HIP response 210 are provided by the user in response to the account creation form. In some embodiments, client 102 and/or server 106 identify the request time 212-1, the cookie 214-1, and the IP address 216-1 associated with the account request 202-1 upon receipt of the account creation form.

As shown in FIG. 2, inverse IP index 114 stores multiple IP records 215 associating IP addresses with user account data. Each IP record 215 in the inverse IP index 114 includes an IP address 216, a user count 222, and one or more unique identifiers 220, such as user ID 204, for each user account associated with the IP address 216. User count 222 is a field storing information about the number of user accounts associated with IP address 216. In one example, the user count 222 includes a count of the number of accounts created in response to requests from a respective IP address 16 during multiple time periods or intervals. In this example, the user count may have a sequence of values, C1, C2, C3, C4, etc., where C1 represents an ongoing user count for a current time period, C2 represents the user count for a first time period prior to the current time period, C3 represents the user count for a second time period prior to the first time period, and so on. Optionally, the user count 222 may include user counts for several (e.g., a number between 2 and 10), recent, short time periods (e.g., one day each), and user counts for one or more (e.g., a number between 1 and 100), less recent, longer time periods (e.g., one week, or eight weeks, or the like).

In some embodiments, account records 218 in user account database 116 and/or IP records 215 in the inverse IP index 114 may include more or less information than described here. For example, IP records 215 in the inverse IP index 114 may include additional fields that store the values of the first count and second count, discussed below, and/or additional fields that store historical counts, which are used to compute the values of the first count and second count. Note that the term "user" in the present application does not necessarily correspond to a human being. In some embodiments, the term "user" may refer to any entity that uniquely identifies a client 102 at a particular time, such as an IP address, a cookie, a pair of user ID and password or a combination thereof.

One way to stop spammers is to compile lists of IP addresses believed to be associated with spammers and block all messages from IP addresses on the lists and prevent their access to web applications. However, since IP addresses may be associated with multiple clients having multiple users, including both spammers and non-spammers, such lists may block legitimate messages and prevent non-spammers from accessing web applications. Thus, when identifying an IP address as a source of spam it is important to distinguish between static IP addresses associated with a single client and IP addresses that may be associated with multiple clients, such as proxy servers.

Figure 3A:
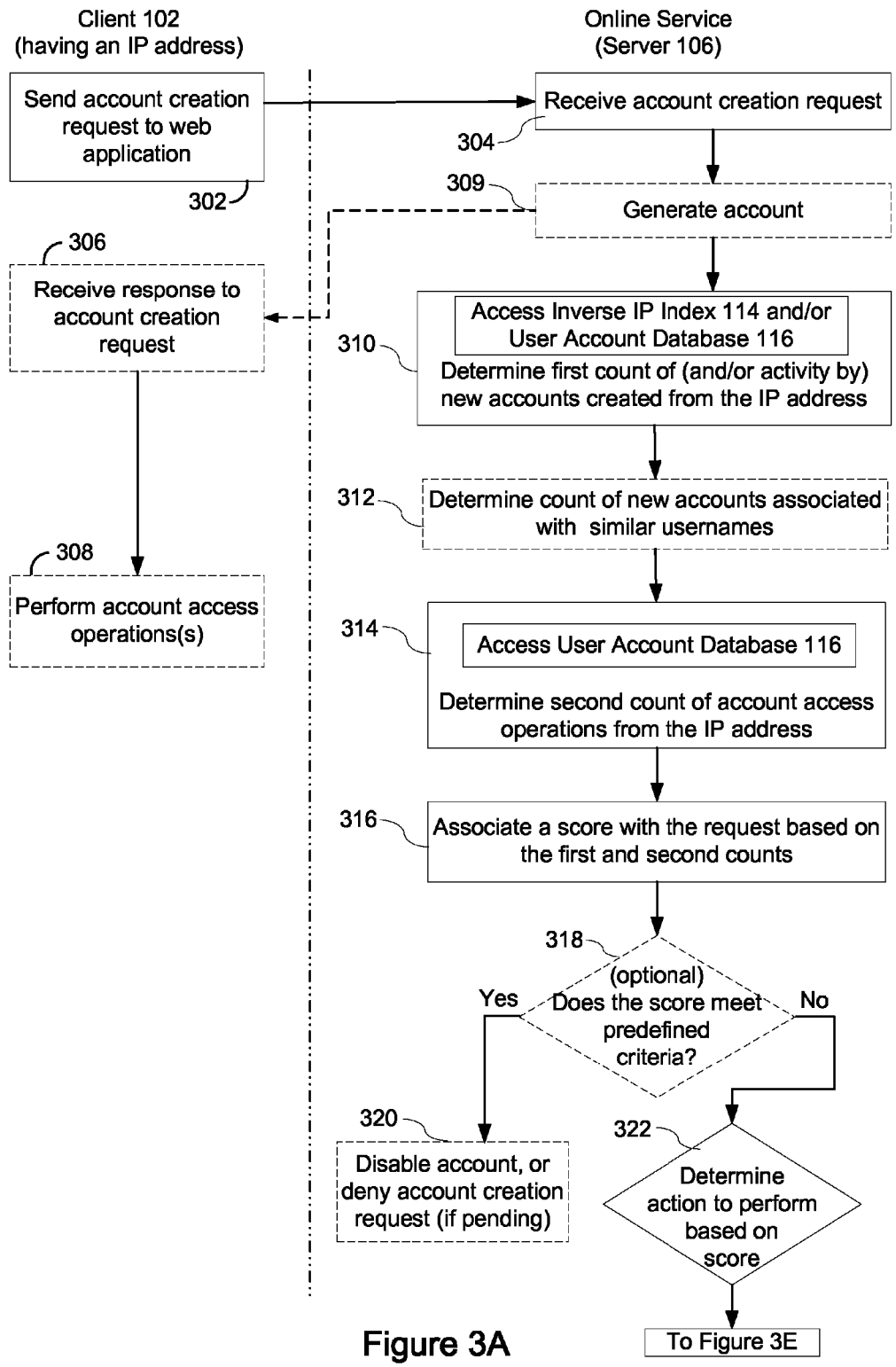
FIG. 3A is a flow diagram of a process for evaluating account creation requests according to some embodiments.

FIG. 3A is a flow diagram of a process for evaluating account creation requests according to some embodiments. In some embodiments some or all of the process is performed by the spam scoring module 112 (FIG. 1). Optional operations are indicated by dashed lines or boxes having dashed-line borders. Operations by a respective client 102, which is associated with an IP address, are shown on the left side of FIGS. 3A-3E, while operations by the server 106 for an online service are shown on the right side of FIGS. 3A-3E. The IP address of the client 102 may be a static, globally unique IP address that always identifies the particular client 102, a dynamically assigned IP address, or an IP address associated with multiple clients, such as the IP address of a proxy server.

In some embodiments, client 102 sends an account creation request to a web application 110 at server 106 (302). In some embodiments, a user of client 102 may use client application 132 (e.g., a browser application) to interact with client 102 to generate the account creation request.

The web server 106 receives the account creation request (304) and creates an account (309). As explained in more detail below, creation of the account may be conditional, or the account may be revoked after it is created. In some embodiments, registration module 120 at the server 106 receives the account creation request and creates the account. For instance, in some embodiments, it may be a default condition that an account is created upon receiving the account creation request before the account creation request is associated with a spam score. In other embodiments, an account is created upon receiving the account creation request before the account creation request is associated with a spam score only in certain situations. For example, when server 106 receives a large number of account creation requests, an account may be created before a spam score is obtained for the associated account creation request.

If server 106 generates an account at block 309, in some embodiments server 106 optionally sends a response to the requesting client 102, responding to the account creation request, prior to performing additional processing of the account creation request. As shown, the client 102 receives the response (306). If the response is positive, a user may perform account access operations (308), examples of which are: logging in to the account using client application 132, and performing the various functions (or, equivalently, accessing various online services) enabled by the account.

In other embodiments, the registration module 120 does not respond to the account creation request until after the spam scoring module 112 has evaluated the request, Evaluating the request typically includes examining historical information in its database and uses that historical information to determines whether or not to grant the request. In the embodiment shown in FIG. 3A, the request is evaluated in part by determining the number (also called the "first count") of new accounts associated with the IP address created during a particular time period (310), sometimes called a first time period. In some embodiments the first time interval (for which a count of new accounts is made) ranges from one day to eight weeks. Other appropriate time intervals may be used in other embodiments. In some embodiments, spam scoring module 112 determines the number of new accounts created from the same IP address by accessing user count 222 stored in inverse IP index 114 (see FIG. 2). As discussed, user count 222 is the number of user accounts associated with an IP address 216. In some embodiments, the user count 222 includes information about the numbers of user accounts associated with an IP address 216 that are created within a plurality of respective time intervals.

In addition to determining the number of new accounts created from the same IP address, the process may inspect activity by accounts previously generated (e.g., generated within the same time interval or a previous time interval) from the same IP address. For example, for an account creation request received on a Tuesday, user account module 118 may query inverse IP index 114 (FIG. 2) to determine the user accounts associated with the IP address. The user account module 118 may also query user account database 116 (FIG. 2) to determine which of the user accounts associated with the IP address were created on Monday and review characteristics of the user accounts, such as the account access operations associated with each account. By querying the inverse IP index 114 and user account database 116, user account module 118 can determine whether there has been an increase in the number of accounts created in response to requests from a given IP address. Additionally, user account module 118 can determine the number and character of the account access operations from each of those accounts.

In some embodiments the character of an account access operation is determined by evaluating whether the corresponding user account was created within a predetermined time window, e.g. a day. For example, user account module 118 may determine that there are 256 "new" account access operations associated with IP address-1 216-1 and 356,798 "old" account access operations associated with IP address-1 216-1. In some cases "new" account access operations are account access operations 1 through Y from user accounts created within the same time interval (in the example above, on Monday). "Old" account access operations may be account access operations associated with user accounts created during a previous time interval (in the example above, Sunday or some period of time before Monday).

This methodology may be used to inspect a set of user accounts created using the same IP address for evidence of spammy or other undesirable activity. The evidence may then be used as a basis for remedial action, such as disabling or limiting access to such accounts. Optionally, in addition to determining the number of new accounts created from the same IP address and/or activity by accounts previously generated from the same IP address, the process may also determine at least one of (i) the distribution of user account creation requests associated with the IP address over time and (ii) the distribution of account access operations associated with the IP address over time. In other words the process may be used to track the number of user accounts created from an IP address over time as well as the number of account access operations associated with those accounts over time. In some cases the distributions may be referred to as a "first count" and a "second count," respectively.

In some embodiments, the first count is a time weighted average of new accounts created from the IP address per time interval during successive time intervals. A third count of new accounts created from the IP address during a recent time interval may be given more weight (e.g., assigned a higher weight) than a fourth count of new accounts created from the IP address during a less recent time interval. For example, for successive time intervals of one day per time interval, the first count may be determined as follows:

$$FirstCount = \frac{\left[ (ThirdCount) + 0.5 * (FourthCount) + \ldots + \left(\frac{1}{n}\right) * ((n+2)thCount) \right]}{n} \quad \text{(Eq. 1)}$$

where ThirdCount is the number of new accounts created one day before the currently pending account creation request, FourthCount is the number of new accounts created two days before the currently pending account creation request, (N+2)thCount is the number of new accounts created n days before the currently pending account creation request, and n is a whole number equal to the number of days over which the number of new accounts created from the IP address per day is being averaged (also called the "time period"). Optionally, the denominator of the equation (see Eq. 1, above) for computing the first count is equal to $$\sum_{i=1}^{n} \frac{1}{i}$$

(i.e., the sum of the weights applied to the counts), instead of n. More generally, the first count is an average or time weighted average, over a time period, of new accounts created from the IP address per time interval, where the time period is equal to two or more time intervals (e.g., a multiple of the time interval). For example, the first count may be the average (or time weighted average) number of new accounts created daily from an IP address over a week, a month, or a year.

In some embodiments, spam scoring module 112 may also determine the number of new accounts associated with usernames that are similar to the username in the new account creation request (312) and that are created within a predefined time period (e.g., a day, N days, a week, N weeks, etc., where N is an integer greater than 1). Whether a respective username is similar to the username in the account creation request is determined using a set of one or more predefined similarity rules, such as stemming, matching the longest common substring, similarity algorithms, or the like. For example, if the username in the new account request is "john," the spam scoring module 112 may treat all new accounts (e.g., newly created accounts or account generation requests) having a username that includes a numerical string before or after the string "john" (e.g., "john01," "2007john," etc.) as new accounts having similar user names. In a related example, using a predefined similarity rule based on prefixes and suffixes, if another username has the same prefix (i.e., initial substring) or the same suffix (i.e., ending substring) as the username in the new account request, that username is treated as similar to the username in the new account creation request. Alternatively, a predefined similarity rule may require that the common prefix or suffix have at least a predefined length (e.g., at least 4 characters) in order for two usernames to be determined to be similar. When a username is determined to be similar to the username in a new account creation request, the account associated with the similar username is counted at operation 312. The total number of recently generated accounts having similar usernames to the username for the current new account creation request may be called a "third count," or "similar username count," or the like.

Spam scoring module 112 may also determine the number (also called the "second count") of account access operations associated with the IP address (314) during a second time period. Optionally, the second time period is the same as the first time period used for computing the first count. In some embodiments, the account access operations comprise account logins (sometimes called "unique logins") associated with the IP address (e.g., logins by one or more respective users of one or more clients at the IP address, or alternatively, logins to accounts created in response to requests received from the IP address). Alternatively, the account access operations that are used for the second count may include other operations associated with the IP address, such as sending an email message, reading an email message, or accessing a resource of the online service. In some embodiments, spam scoring module 112 determines the number of account access operations associated with the IP address by accessing the user account database 116 (discussed above in reference to FIG. 2), which stores information regarding each account access operation associated with a respective user account.

Optionally, spam scoring module 112 may determine the second count without limiting the count of access operations to any time interval. In other embodiments, spam scoring module 112 determines the second count based on account access operations associated with the IP address during successive predefined time intervals of the second time period. In various embodiments, each of the predefined time intervals is a day, N days, a week, or N weeks, where N is an integer greater than one. In some embodiments, the second count is a weighted average of account access operations during the time intervals. Further, in some embodiments, a count of account access operations on accounts created during a recent time interval is given less weight than a count of account access operations on accounts created during a less recent time interval. For example:

$$SecondCount = \frac{AccessOps \text{ on New Accounts} + C2 * (\text{Access Ops on Older Accounts})}{1 + C2} \quad \text{(Eq. 2)}$$

where "AccessOps on New Accounts" is a count (e.g., a fifth count) of account access operations (over a predefined period of time) on new accounts associated with the IP address, created within a predefined time interval, such as the last week or N days, C2 is a constant or coefficient having a predefined value greater than one, and "AccessOps on Older Accounts" is a count (e.g., a sixth count) of account access operations (over the predefined period of time) on older accounts associated with the IP address, created prior to the predefined interval. C2 is greater than one so as to give account access operations on older accounts (created during a less recent time interval) more importance than account access operations on new accounts (created during a recent time interval). Account access operations on older accounts is an indicator of legitimate (non-spammy) accounts associated with the IP address. In some embodiments, the second count is a count of account access operations (over the predefined period of time) only on older accounts associated with the IP address, created prior to a predefined interval.

In some embodiments, spam scoring module 112 may associate a score ($Score_{IP\_Address}$) with the account creation request based at least on the first and second counts (316). The score may be called a "spam score" and may be a function of the first count and the second count, or a combination of counts (optionally including one or more other counts, such as the "similar username count" discussed above, in addition to the first and second counts) determined by the spam scoring module 112. In some embodiments, the score is proportional to a ratio of the first count to the second count. Note that the score as described here in connection with FIG. 3A is an IP address related score. In some embodiments, this score is defined as follows:

$$Score_{IP\_Address} = W1*(FirstCount)/(1+SecondCounti)$$

where W1 is a weighting factor of the IP address related score if the score is to be combined with the other types of spam scores, such as one or more of the other spam scores described below. In some embodiments, the value of W1 is chosen such that there is an appropriate ratio between the IP address-based spam score and the other types of spam scores. For example, W1 may range from 1 to 50.

Spam scoring module 112 determines if the score meets predetermined criteria (318). If the score meets the predetermined criteria, the account created at block 309 may be disabled (320). For example, if the score exceeds a predetermined threshold indicating that many more accounts associated with an IP address were created than were accessed in the last day, the account created at block 309 in response to the account creation request may be disabled (320). If the score does not meet the predefined criteria, an action to perform based on the score is determined (322) according to the process shown in FIG. 3E.

Figure 3B:
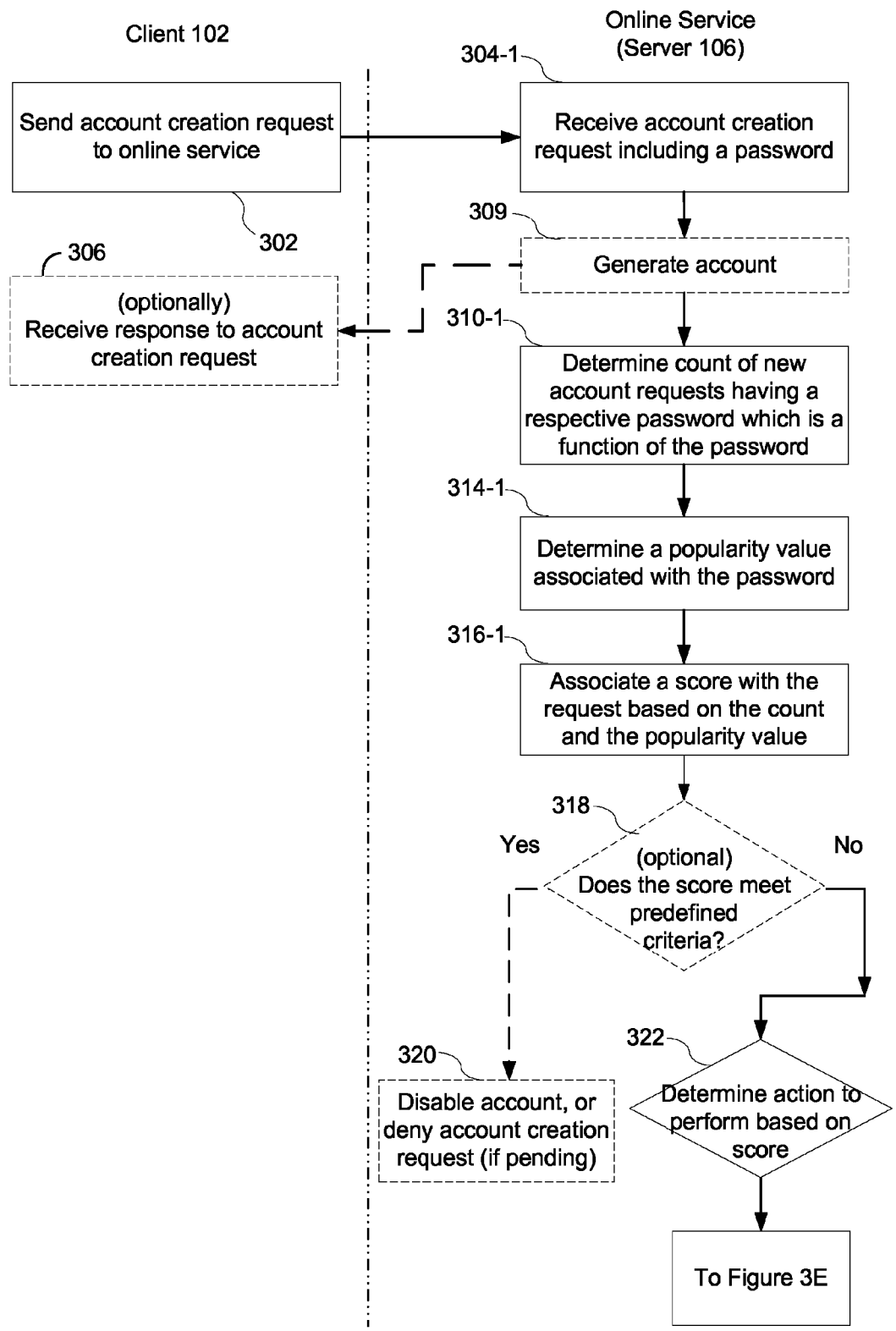
FIG. 3B is a flow diagram of a process for evaluating account creation requests according to some embodiments.

FIG. 3B is a flow diagram of a process for evaluating account creation requests according to another embodiment. In some embodiments some or all of the process is performed by the spam scoring module 112. Optional operations are indicated by dashed lines or boxes having dashed-line borders. Furthermore, operations that are the same as or similar to the operations in the process depicted by FIG. 3A have been labeled with the same or similar reference numbers and will be described briefly here. In this process, a client 102 sends an account creation request to an online service (302). The account creation request includes a password. In some embodiments, a user of client 102 may use client application 132 (e.g., a browser application) to interact with client 102 to generate the account creation request.

A server 106 providing an online service, or a server performing account management services for the online service, receives the account creation request, including the password (304-1). In some embodiments, registration module 120 receives the account creation request (304-1) and optionally creates an account (309), as discussed above with reference to FIG. 3A. The online service determines a count of new account requests (also called "PasswordCount"), received within a predefined period of time, that have the same password as the password in the account creation request now being processed. Alternatively, the password count can be a count of new account requests within the predefined period of time having respective passwords that are similar to, or more generally, a function of, the password in the account creation request now being processed (310-1).

In some embodiments, the predefined time period may range from one day to one month or any other time interval deemed appropriate according to the type of service offered by the online service. In some embodiments, the function (used in operation 310-1) is the identity function of the password (i.e., the passwords must be the same). In some other embodiments, the function is to determine if two passwords meet predefined similarity criteria. For example, whether a respective password is similar to the password in the account creation request may be determined using a set of similarity rules, such as stemming, matching the longest common substring, similarity algorithms, or the like. In one example, if two passwords share the same prefix (i.e., initial substring), or the same suffix (i.e., ending substring), they are deemed to be similar to each other. Alternatively, a predefined similarity rule may require that the common prefix or suffix have at least a predefined length (e.g., at least 4 characters) in order for two usernames to be determined to be similar. In yet another example, the function used to determine if two passwords are similar may require the two passwords to be the same after removing from the passwords the usernames (or the same portions of the usernames) of the accounts associated with the two passwords. When an account password is determined to be similar to the password associated with a new account creation request, the account associated with the similar password is counted at operation 310-1.

In some embodiments, the methodology described above in connection with the determination of the first count, or alternatively the methodology described above in connection with the determination of the second count, is used to determine the PasswordCount as an average or time weighted average of the multiple counts of new account creation requests having similar passwords, one count per time interval, over a time period that is longer than a single time interval.

For the password in the account creation request, the online service (e.g., the spam scoring module 112 of a server 106 for the online service) determines a popularity value associated with the password (also called "PasswordPopularityValue") (314-1). In some embodiments, the password popularity is a function of (i) the number of accounts that have the same or similar passwords, and/or (ii) the number of times the same or similar passwords have been used by some users (e.g., hackers) who attempt unauthorized access to other accounts over a predefined period of time, such as a day, week, or year. From analyzing the user account records 218 in the user account database 116, it is possible for the online service (e.g., the spam scoring module 112 of a server 106 for the online service) to identify a set of popular passwords used by many authorized users. In some embodiments, the popularity of a password is set to a default value (e.g., 1) unless the number of accounts using the same or similar passwords or the number of unauthorized attempts using the password is greater than a threshold value.

Based at least in part on the count (PasswordCount) and the popularity value (PasswordPopularityValue), the spam scoring module 112 associates a score ($Score_{Password}$) with the account creation request (338). In some embodiments, the score is inversely proportional to (or more generally, inversely related to) the popularity value of the password. The score may be referred to as a "spam score" or may be one of multiple components considered by the spam scoring module 112 for determining the spam score. In some embodiments, this score is set to be lower for accounts created with popular passwords than for accounts created with less popular passwords. This spam scoring methodology is based on the observation that an account creation request with a popular password is more likely from an authorized user of the online service and an account creation request with a more unique password is more likely from an unauthorized user. An exemplary formula for determining the password-related spam score is as follows:

$$Score_{Password} = W2*(PasswordCount/PasswordPopularityValue)$$

where W2 is a weighting factor if the score is to be combined with the other types of spam scores, such as one or more of the other spam scores described in this application. In some embodiments, the value of W2 is chosen in light of the other weighting factors, such as W1 described above, such that there is an appropriate ratio between the password-based spam score and the other types of spam scores.

Spam scoring module 112 determines if the score meets predetermined criteria (318). For example, the score may be compared with a predefined threshold value. If the score meets the predetermined criteria (e.g., the score is above the predefined threshold) (318—Yes), the created account may be disabled (320) or, if a pending account creation request is being processed, the account creation request may be denied. If the score does not meet the predefined criteria (318—No), the spam scoring module 112 (or the online service for which an account creation request has been made) determines what action to perform based on the score (322) according to the process shown in FIG. 3E. In some embodiments, the action to be performed includes at least one of: refusing the account creation request, modifying an account created in response to the account creation request (e.g., disabling the account or limiting the account access), accepting the account creation request, and maintaining the newly-created account.

In some embodiments, options for limiting the account access include at least one of requiring a response to a human interaction proof from the requesting client 102 for access to the account, limiting access time to the account (e.g., the user may be allowed to access the account only within a predefined time period within each day), limiting use of account functions (e.g., the user may be allowed to only receive messages delivered to the account but not send messages from the account), and limiting transmission from the account (e.g., the user may be allowed to send no more than a predefined number of messages from the account within each day).

Figure 3C:
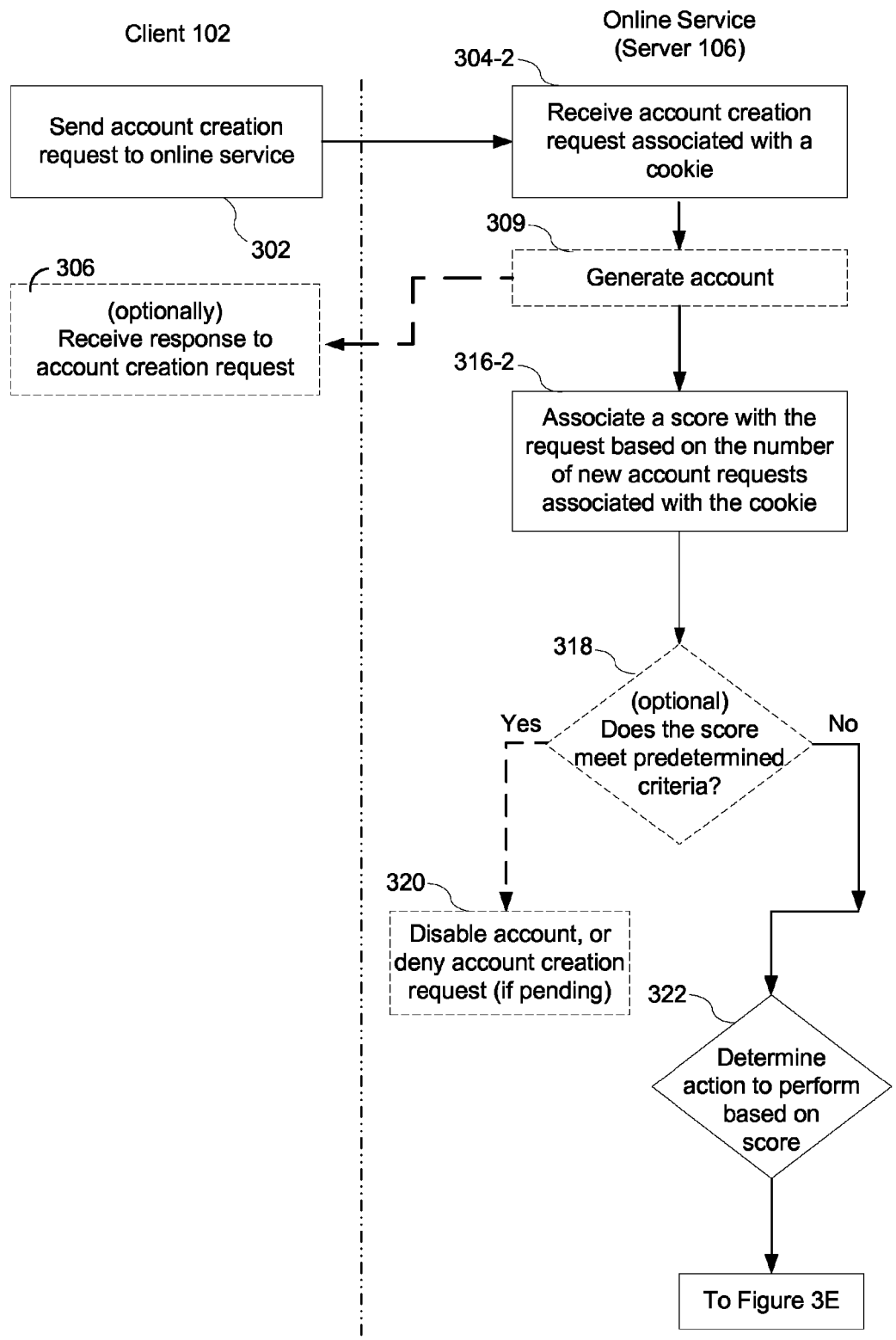
FIG. 3C is a flow diagram of a process for evaluating account creation requests according to some embodiments.

FIG. 3C is a flow diagram of a process for evaluating account creation requests according to another embodiment. In some embodiments some or all of the process is performed by the spam scoring module 112. Optional operations are indicated by dashed lines or boxes having dashed-line borders. Furthermore, operations that are the same as or similar to the operations in the process depicted by FIG. 3A have been labeled with the same or similar reference numbers and will be described briefly here. In this process, a client 102 sends an account creation request to an online service (302). The account creation request is associated with a cookie. In some embodiments, a user of client 102 may use client application 132 (e.g., a browser application) to interact with client 102 to generate the account creation request.

The online service, or its proxy, receives the account creation request associated with the cookie (304-2). In some embodiments, registration module 120 optionally creates an account (309).

The spam scoring module 112 associates a score (sometimes known as "CookieCount") with the account creation request (316-2), based at least in part on a number of new account requests associated with the same cookie (as the cookie associated with the account creation request) received during a predefined time period. In some embodiments, the predefined time period has a duration that is in the range of one day to one month. The spam scoring module 112 associates a score (sometimes known as "CookieCount") with the account creation request (316-2), based at least in part on a number of new account requests associated with the same cookie (as the cookie associated with the account creation request) received during the predefined time period. The number of new accounts created using the same cookie over the predefined time period is indicative of spam account generation. Two cookies are determined to be the same if the same unique identifier is found in both cookies, received with the account creation requests (e.g., using the HTTP protocol) for generating the corresponding new accounts. In some embodiments the number of new accounts (created during the predefined time period) that are associated with the same cookie must be greater than a predefined threshold (e.g., two) for this score to be greater than zero. In some embodiments, the cookie-based spam score is defined as:

$$Score_{Cookie} = W3 * CookieCount$$

where W3 is a weighting factor if the score is to be combined with the other types of spam scores, such as one or more of the other spam scores described in this application. In some embodiments, the value of W3 is chosen in light of the other weighting factors such as W1 and W2 described above such that there is an appropriate ratio between the cookie-based spam score and the other types of spam scores. In some embodiments, W3 is equal to zero when CookieCount is less than a threshold value and is equal to a non-zero value otherwise. In yet other embodiments, ScoreCookie is equal to W3 times a predefined function of CookieCount, where the predefined function is a linear or non-linear function of CookieCount (e.g., a piecewise linear function which is equal to zero below a first threshold, and which linearly or non-linearly increases from a starting value when CookieCount is above the first threshold).

In some embodiments, the methodology described above in connection with the determination of the first count, or alternatively the methodology described above in connection with the determination of the second count, is used to determine the CookieCount as an average or time weighted average of the multiple counts of new account creation requests having the same cookie, one count per time interval, over a predefined time period that is longer than a single time interval.

The server 106 or online service (e.g., the spam scoring module 112 of the server 106 or online service) determines if the score meets predetermined criteria (318). If the score meets the predetermined criteria (318, yes), the created account (see 309) may be disabled (320) or, if a pending account creation request is being processed, the account creation request may be denied. If the score does not meet the predefined criteria (318, no), the spam scoring module 112 determines what action to perform based on the score (322) according to the process shown in FIG. 3E. In some embodiments, the action to be performed includes at least one of: refusing the account creation request, modifying an account created in response to the account creation request (e.g., disabling the account or limiting the account access), accepting the account creation request, and maintaining the newly-created account.

In some embodiments, options for limiting the account access include at least one of requiring a response to a human interaction proof from the requesting client 102 for access to the account, limiting access time to the account (e.g., the user may be allowed to access the account only within a predefined time period within each day), limiting use of account functions (e.g., the user may be allowed to only receive messages delivered to the account but not send messages from the account), and limiting transmission from the account (e.g., the user may be allowed to send no more than a predefined number of messages from the account within each day).

Figure 3D:
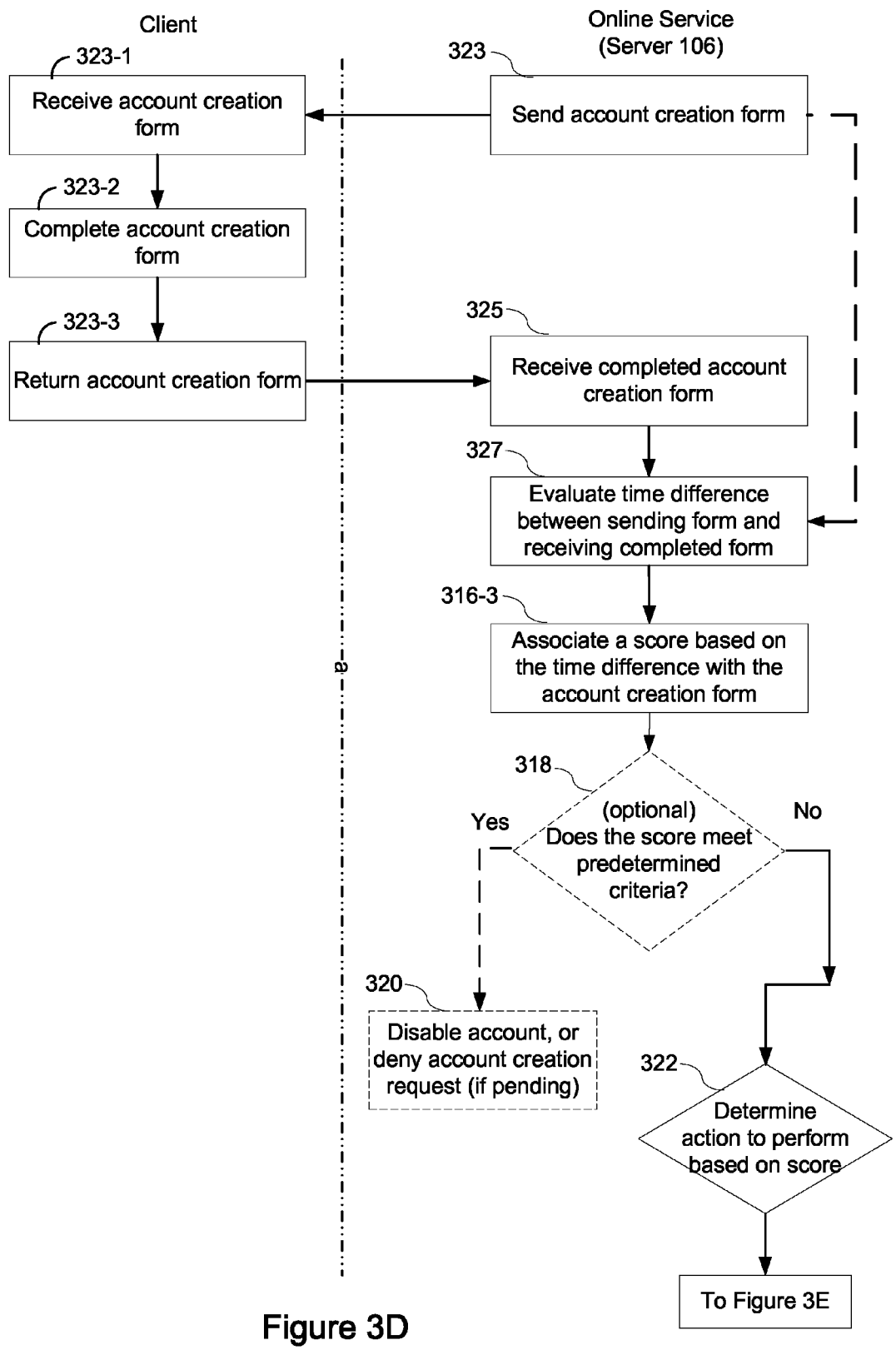
FIG. 3D is a flow diagram of a process for evaluating account creation requests according to some embodiments.

FIG. 3D is a flow diagram of a process for evaluating account creation requests according to another embodiment. In some embodiments some or all of the process is performed by the spam scoring module 112. Optional operations are indicated by dashed lines or boxes having dashed-line borders. Furthermore, operations that are the same as or similar to the operations in the process depicted by FIG. 3A have been labeled with the same or similar reference numbers and will be described briefly here.

In this process, the online service sends an account creation form including a human interaction proof to a client 102 (323). In some embodiments, the account creation form is sent out in response to an account creation request associated with the client 102.

Upon receiving the account creation form (323-1), a user at the client needs to complete the account creation form (323-2) by providing the information requested by the form. In some embodiments, the information includes at least a subset of username, password, security question/answer, secondary email, location, HIP test, etc. The term "HIP" is an acronym for "Human Interaction Proof," an example of which is described below in connection with FIG. 4. The completed form, including a response to the human interaction proof from the client 102, is returned to the online service (323-3).

After receiving the completed account creation form (325), the spam scoring module 112 evaluates a time difference between sending the form and receiving the completed form (also referred as "HIPResponseTime") (327). In some embodiments, this time difference is also referred to as "response time." Although automated tools may be used by unauthorized users (e.g., spammers) of the online service to fill certain parts (e.g., username and password) of the account creation form, these automated tools are often useless when faced with a HIP test. Therefore, it is common for humans to be involved in the spamming activities in order to deal with HIP tests.

Because of the human's learning capability, a person can respond to the HIP test much faster than ordinary people after he or she practices for a certain number of times. Therefore, a noticeable difference between account creation requests from spammers and account creation requests from ordinary users is that the response time from a spammer is much shorter than the average response time from an ordinary user. For example, if the average response time for completing the account creation form for a particular online service (also called "Average_HIPResponseTime"), including a HIP test, is 40 seconds, the response time from a spammer for completing the same form could be less than 15 seconds, which is indicative of spam account generation.

Based at least in part on the time difference (HIPResponseTime), spam scoring module 112 associates a score ($Score_{HIP}$) with the account creation form (316-3). In some embodiments, other factors, such as one or more of the spam scoring factors discussed elsewhere in this application, also contribute to the spam score generated by the spam scoring module. In some embodiments, the score is inversely proportional (or more generally, inversely related) to the time difference. In some embodiments, the score is equal to a default value unless the time difference is less than a predetermined threshold. In some embodiments, the score is a function of the time difference and an average time difference over a predefined time period (e.g., a day, N days, a week, N weeks, etc., where N is an integer greater than 1). For example, the HIP-related spam score may be defined as follows:

$Score_{HIP}=W4*(Average\_HIPResponseTime/HIPResponseTime)$ where W4 is a weighting factor if the score is to be combined with the other types of spam scores described in this application. In some embodiments, the value of W4 is chosen in light of the other weighting factors such as W1, W2, and W3 described above such that there is an appropriate ratio between the HIP-based spam score and the other types of spam scores. In some embodiments, $Score_{HIP}$ is equal to W4 times a predefined function of Average_HIPResponse Time and HIPResponse Time, where the predefined function is a linear or non-linear function of HIPResponse Time and HIPResponse Time (e.g., a piecewise linear function).

In some other embodiments, a table lookup function is used to generate the score based on the response time as follows (note that the weighting factor W4 may still be needed to adjust these scores when they are combined with the other types of spam scores):

| Response Time (Seconds) | HIPScore |
|---|---|
| >15 | 0 (legitimate) |
| 11-15 | 1 (suspicious) |
| 10 | 2 |
| 9 | 3 |
| 8 | 4 |
| 7 | 5 |
| 1-6 | 10 (unusually fast, highly indicative of a spammer) |

Spam scoring module 112 determines if the score meets predetermined criteria (318). If the score meets the predetermined criteria (318, yes), the created account may be disabled (320) or, if a pending account creation request is being processed, the account creation request may be denied. If the score does not meet the predefined criteria (318, no), the spam scoring module 112 determines what action to perform based on the score (322) according to the process shown in FIG. 3E. In some embodiments, the action to be performed includes at least one of: refusing the account creation request, modifying an account created in response to the account creation request (e.g., disabling the account or limiting the account access), accepting the account creation request, and maintaining the newly-created account in response to the account creation request.

In some embodiments, options for limiting the account access include at least one of requiring a response to a human interaction proof from the requesting client 102 for access to the account, limiting access time to the account (e.g., the user may be allowed to access the account only within a predefined time period within each day), limiting use of account functions (e.g., the user may be allowed to only receive messages delivered to the account but not send messages from the account), and limiting transmission from the account (e.g., the user may be allowed to send no more than a predefined number of messages from the account within each day).

In some embodiments, a username-based analysis is employed to determine a username-related spam score. For example, a count of similar account names generated by the same user or from the same IP address during a particular time interval (also known as "UsernameCount" or "AccountnameCount") is determined using the methodologies described elsewhere in this application, such as various measurements of the username similarity. Based at least in part on this count, a username-based spam score can be defined as:

$Score_{Username}=W5*UsernameCount$ where W5 is a weighting factor if the score is to be combined with the other types of spam scores, such as one or more of the other spam scores described in this application. In some embodiments, the value of W5 is chosen in light of the other weighting factors such as W1, W2, W3, and W4 described above such that there is an appropriate ratio between the Username-based spam score and the other types of spam scores.

In some embodiments, the spam scoring module 112 employs two or more of the schemes described above to determine multiple spam scores, each score having its own merit and sensitivity in detecting spam account generation activities. The spam scoring module 112 combines two or more of the multiple spam scores into a hybrid spam score using a predefined formula and gives each type of spam score an appropriate weighting factor. In practice, the predefined formula and the weighting factors can be determined through various experiments and heuristics. One exemplary formula is as follows:

$$\text{Spam\_Score} = \text{Score}_{IP\_Address} + \text{Score}_{Password} + \text{Score}_{Cookie} + \text{Score}_{Username} + \text{Score}_{HIP}.$$

Note that the hybrid spam score does not have to include all the types of spam scores described in this application, and instead may include, two, three or four of the types of spam scores described above. Alternately, or in addition, the hybrid spam score may include other types of spam scores, such as other spam scores that would be apparent in light of the present application. Similarly, the combination of the different types of spam scores does not have to be linear as shown above. Other types of combination (e.g., non-linear or piecewise linear combinations) would be possible in light of the teachings herein.

Figure 3E:
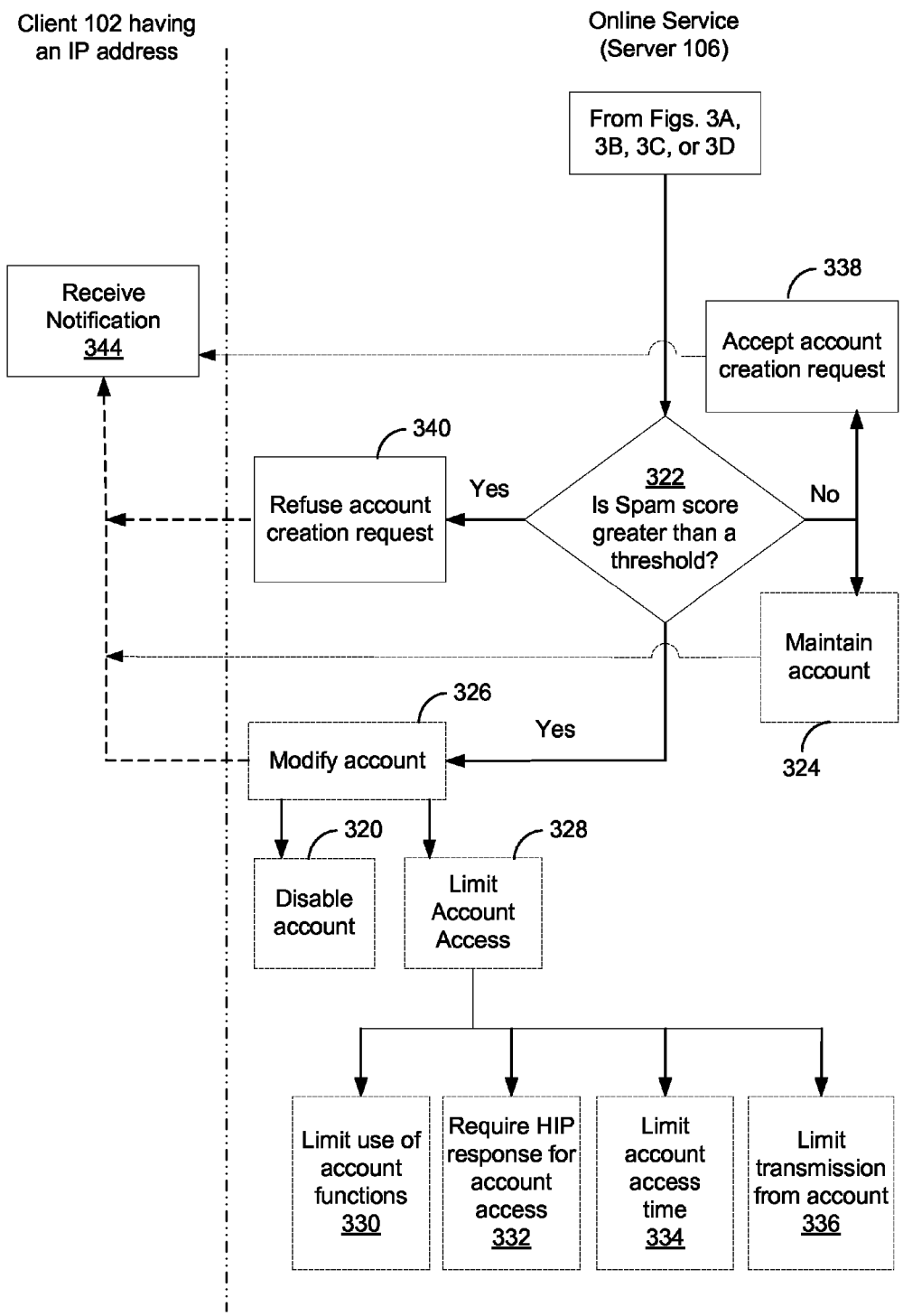
FIG. 3E is a flow diagram of a process for acting on scores associated with account creation requests according to some embodiments.

FIG. 3E is a flow diagram of a process for performing actions in accordance with the spam scores associated with account creation requests according to some embodiments. In some embodiments some or all of the process is performed by user account module 118 of a server 106 for an online service. Optional operations are indicated by dashed lines or boxes having dashed-line borders. After associating a spam score with the account creation request (316, 316-1, 316-2, 316-3), the user account module 118 may determine an action to perform based on the spam score being compared with a predetermined threshold (322). In some embodiments, user account module 118 receives a spam score associated with an IP address from spam scoring module 112. In some embodiments, additionally or in the alternative, user account module 118 receives an indication from spam scoring module 112 that the spam score exceeds the predetermined threshold. The predetermined threshold may be a static threshold, or may be dynamically determined based on one or more criteria, such as capacity of server 106, utilization of server 106, and so on.

In some embodiments, the account creation request is accepted (338) if the spam score indicates a low to moderate likelihood that the account will be used to generate spam. If the account creation request is accepted (338), user account module 118 typically sends an account creation notice to the client 102. The client 102 receives the account creation notice (344), if one is sent by user account module 118. In some embodiments, the account creation notice may include account terms that limit account access, in some or all of the ways described above, if the score indicates a moderate likelihood that the account will be used to generate spam.

In addition to accepting the account creation request associated with the IP address, if the spam score indicates a low likelihood that the account will be used to generate spam, user account module 118 may take further action with the account generated at block 309 (if one was generated) and/or other accounts associated with the IP address. In some embodiments, the account generated at block 309 (if one was generated) and/or one or more other existing accounts associated with the IP address may be maintained (324). For example, if the spam score indicates that there is a low chance that the account is used to generate spam, the account is maintained (324) without change to the terms of the account.

In another example, the user account module 118 refuses an account creation request (340) if the corresponding spam score indicates a moderate to high likelihood that the account will be used to generate spam. If the account creation request is refused (340), user account module 118 optionally sends an account refusal notice to the client 102, for instance via network communication module 108. The client 102 may receive the account refusal notice (344).

In addition to refusing the account creation request associated with the IP address, if the spam score indicates a moderate to high likelihood that the account will be used to generate spam, user account module 118 may take further action with the account generated at block 309 (if one was generated) and/or other accounts associated with the IP address. In particular, the account generated at block 309 (if one was generated) and/or one or more other existing accounts associated with the IP address may be modified (326). In some embodiments, an account is modified (326) by disabling or closing the account (320) or limiting account access (328). Limiting account access (328) includes one or more of: limiting use of account functions (330), requiring a response to a HIP for one or more additional account access operations associated with the account (332), limiting access time to the account (334), and limiting transmission from the account (336).

As noted above, the user account module 118 may limit account access by limiting the use of the account functions (330). For example, if the account is an email account, the use of the account functions may be limited by restricting the user's ability to send email but allowing the user to receive email. In some embodiments, the user account module 118 may require a HIP response for account access (332), including the use of some or all account functions. In some embodiments, the user account module 118 may modify the account by limiting access time to the account (334), for example to thirty minutes (or any other suitable amount of time) per day. In some embodiments, the user account module 118 may modify the account by limiting transmission from the account (336), for example by permitting only ten transmissions (e.g., limiting email messages sent from the account to ten messages, and/or sending messages to no more than ten email addresses) from the account per day. In some cases, the user account may be modified by setting the user to a "probation" state, in which any other indication of spam activity or other undesirable activity, such as a verified spam posting or a flag by another user, will cause the account to be disabled or closed.

Figure 4:
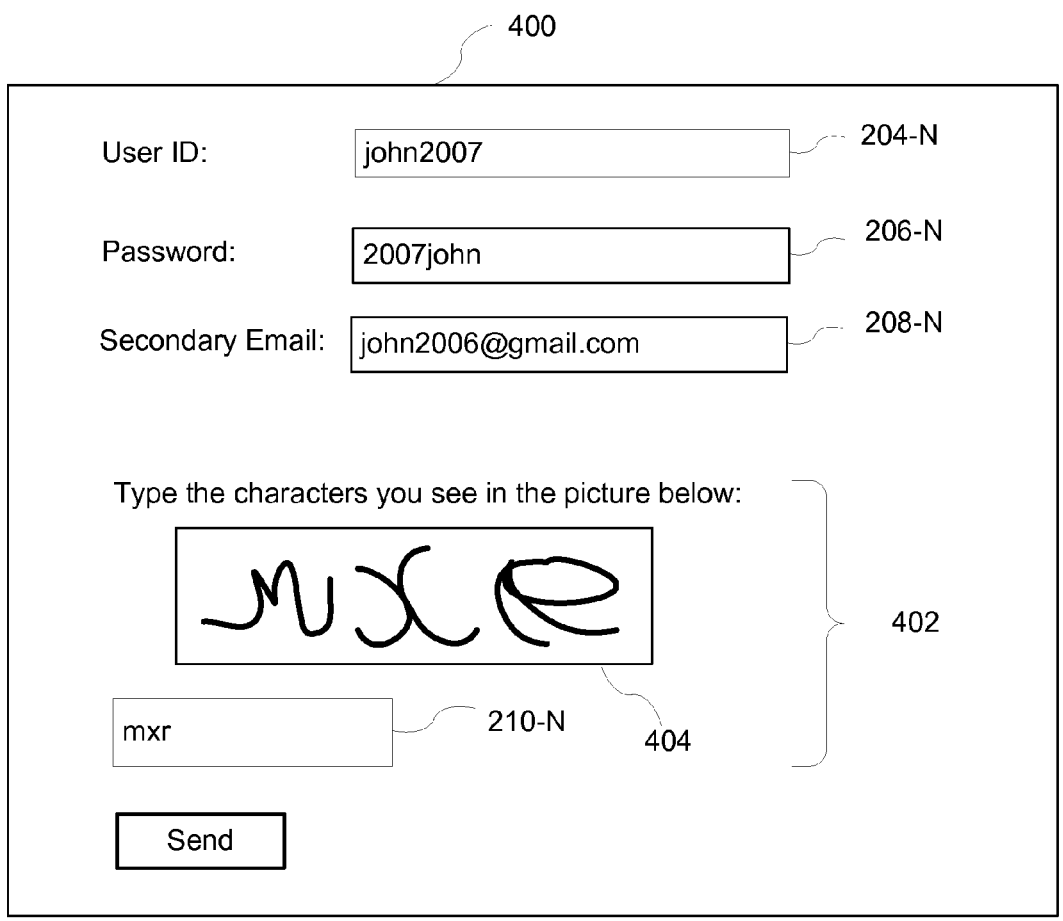
FIG. 4 is an illustration of a graphical user interface (GUI) showing an example of a human interaction proof according to some embodiments.

FIG. 4 is an example of a graphical user interface (GUI) 400 showing a form requiring a HIP test 402 according to some embodiments. Human interaction proof (HIP) tests are challenge-response type tests that are used to distinguish between human and computer users. As used herein, HIPs include CAPTCHAs® (Completely Automated Public Turing tests to tell Computers and Humans Apart) available from Carnegie Mellon University, text recognition tests, image recognition tests, and the like. An example of an HIP test is element 402 in FIG. 4. In some embodiments, a HIP test 402 shows warped or distorted text 404 to the user that is difficult or impossible for current computers to recognize. The user is then required to input, using keyboard characters, the sequence of symbols (e.g., text or characters from a particular language) in the distorted text 404. An example of a user input HIP response 210-N is shown in FIG. 4.

As discussed above, web application 110 may limit account access by requiring a response to a HIP test 402 in order to access the account (332). In some embodiments, a user may be required to send a response to a HIP test 210-N, along with User ID 204-N, password 206-N, and secondary email address 208-N associated with the account in order to login if the spam score meets a predetermined threshold. In alternate embodiments, the user may be required to provide more or less information.

FIG. 5 is an example of a GUI 500 showing an account creation form 502 according to some embodiments. Account creation form 502 may include fields for the user's first name 504, last name 506, and desired login name 508. In some embodiments, account creation form 502 includes a button 510 allowing the user to check the availability of desired login name 508. The account creation form 502 may also include fields for the user to choose a password 512, confirm the password 514, choose a security question 516, answer the security question 518, provide a secondary email address, such as secondary email address 208-N, and indicate the user's geographic location 520. In some embodiments, the web application 110 requires the user to agree to the terms of service 522, program policy, and privacy policy in order to submit the account request form 502 with the button 524. In alternate embodiments, the account creation form may include more or fewer fields and buttons, require answers to some or all fields, or include a HIP test 402.

Figure 6:
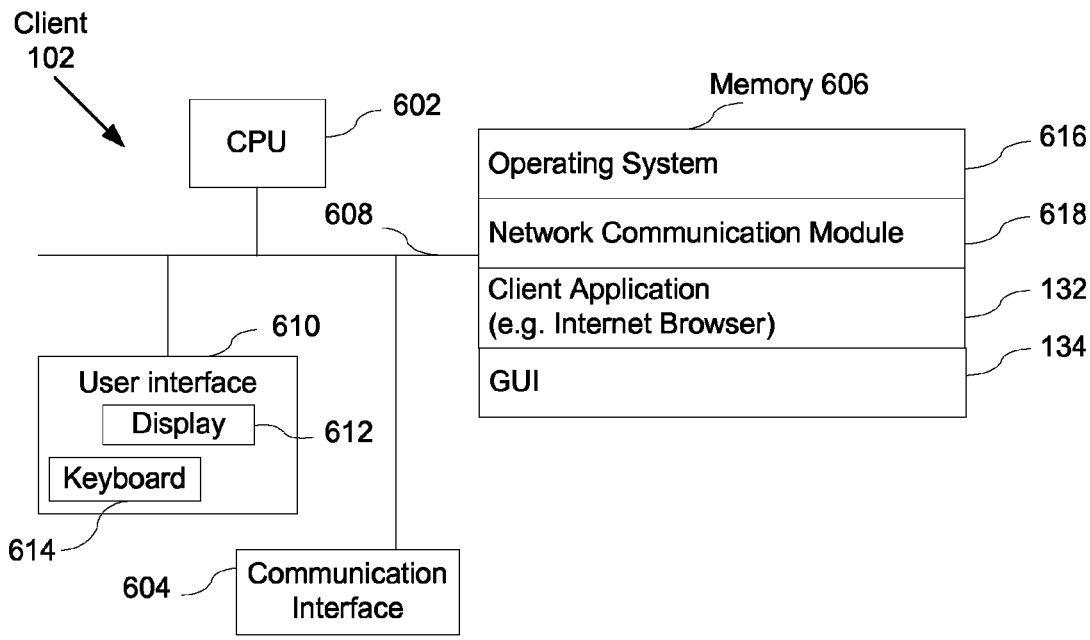
FIG. 6 is a block diagram of a client according to some embodiments.

FIG. 6 is a block diagram of a client 102 according to some embodiments. The client 102 of FIG. 6 may be the client participant in any of the methods and systems described above. The client 102 typically includes one or more processing units (CPUs) 602, one or more network or other communications interfaces 604, memory 606, and one or more communication buses 608 for interconnecting these components. The communication buses 608 may include circuitry (sometimes called a chipset) that interconnects and controls communications between system components. The client 102 optionally includes a user interface 610, which optionally includes a display 612 and a keyboard 614.

Memory 606 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 606 may optionally include one or more storage devices remotely located from the CPU(s) 602. Memory 606, or alternately non-volatile memory device(s) of memory 606, comprises a computer readable storage medium. In some embodiments, memory 606 or the computer readable storage medium of memory 606 stores the following programs, modules and data structures, or a subset thereof:

- an operating system 616 that includes procedures for handling various basic system services and for performing hardware dependent tasks;
- a network communication module 618 that is used for connecting the client 102 to other computers via the one or more communication network interfaces 604 and one or more communication networks 104, such as the Internet, other wide area networks, local area networks, metropolitan area networks, and the like;
- a client application 132 (e.g., a browser application) that enables a user to interact with the client 102 and to access remotely located resources via the one or more communication networks 104, as described above; and
- a GUI 134 for displaying information.

FIG. 7 is a block diagram of a server system 106 according to some embodiments. The server system 106 of FIG. 7 may be the server participant in any of the methods and systems described above. Server system 106 (sometimes called an online service, or online service system or online application system) typically includes one or more processing units (CPUs) 702, one or more network or other communications interfaces 704, memory 706, and one or more communication buses 708 for interconnecting these components. The communication buses 708 may include circuitry (sometimes called a chipset) that interconnects and controls communications between system components. The server system 106 may optionally include a user interface, for instance a display and a keyboard.

Memory 706 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 706 may optionally include one or more storage devices remotely located from the CPU(s) 702. Memory 706, or one or more of the non-volatile memory devices in memory 806 comprise a computer readable storage medium that stores one or more programs for execution by one or more processors. In some embodiments, memory 706 or the computer readable storage medium of memory 706 stores the following programs, modules and data structures, or a subset thereof:

- an operating system 710 that includes procedures for handling various basic system services and for performing hardware dependent tasks;
- a network communication module 108 that is used for connecting the server system 106 to other servers or computers (e.g., clients) via one or more communications interfaces 704 and one or more communication networks (wired or wireless) (such as communication network 104), such as the Internet, other wide area networks, local area networks, metropolitan area networks, and so on;
- a web application 110 that provides services to users with user accounts 122;
- a spam scoring module 112 that assigns scores to user accounts;
- an inverse IP index 114 for storing data regarding the user accounts in records associated with respective IP addresses, including the number of user accounts associated with each IP address;
- a user account database 116 for storing data regarding the user accounts, including new account requests and account access operations in user records associated with respective user accounts; and
- a user account module 118 for managing user accounts 122 for the web application 110; the user account module 118 may include a registration module 120 for creating new user accounts as described above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer implemented method, comprising:
at a server having one or more processors and memory storing one or more programs executed by the one or more processors:
receiving an account creation request associated with a cookie;
associating a score with the account creation request, based at least in part on a number of new account requests associated with the cookie received during a predefined time period; and
performing an action associated with the account creation request based at least in part on the score, wherein the action includes at least one of refusing the account creation request, modifying an account created in response to the account creation request, accepting the account creation request, and maintaining the account created in response to the account creation request.

2. The computer implemented method of claim 1, wherein the predefined time period has a duration that is in the range of one day to one month.

3. The computer implemented method of claim 1, wherein modifying the account created in response to the account creation request comprises disabling the account or limiting account access.

4. The computer implemented method of claim 3, wherein limiting account access includes at least one of requiring a response to a human interaction proof for access to the account, limiting access time to the account, limiting use of account functions, and limiting transmission from the account.

5. The computer implemented method of claim 1, wherein if the score meets predetermined criteria, the action associated with the account creation request comprises disabling the account.

6. The computer implemented method of claim 1, wherein the number of new account requests associated with the cookie is an average, over a time period, of new account requests associated with the cookie received during successive time intervals; wherein the predefined time period is longer than each of the time intervals.

7. The computer implemented method of claim 1, wherein the score is greater than zero only if the number of new account requests associated with the cookie meets a predetermined threshold.

8. A computer system, comprising:
one or more processors;
memory; and
one or more programs, wherein the one or more programs are stored in the memory and configured to be executed by the one or more processors, the one or more programs including:
instructions for receiving an account creation request associated with a cookie;
instructions for associating a score with the account creation request, based at least in part on a number of new account requests associated with the cookie received during a predefined time period; and
instructions for performing an action associated with the account creation request based at least in part on the score, wherein the action includes at least one of refusing the account creation request, modifying an account created in response to the account creation request, accepting the account creation request, and maintaining the account created in response to the account creation request.

9. A non-transitory computer readable storage medium and one or more computer programs embedded therein, the one or more computer programs comprising instructions, which when executed by a computer system, cause the computer system to:
receive an account creation request associated with a cookie;
associate a score with the account creation request, based at least in part on a number of new account requests associated with the cookie received during a predefined time period; and
perform an action associated with the account creation request based at least in part on the score, wherein the action includes at least one of refusing the account creation request, modifying an account created in response to the account creation request, accepting the account creation request, and maintaining the account created in response to the account creation request.

10. A computer implemented method, comprising:
at a server having one or more processors and memory storing one or more programs executed by the one or more processors:
sending an account creation form including a human interaction proof to a client;
receiving the account creation form including a response to the human interaction proof from the client;
evaluating a time difference between the sending and the receiving;
associating a score, based at least in part on the time difference, with the account creation form; and
performing an action associated with the account creation form based at least in part on the score, wherein the action includes at least one of refusing the account creation form, modifying an account created in response to the account creation form, accepting the account creation form, and maintaining the account created in response to the account creation form.

11. The computer implemented method of claim 10, wherein modifying the account created in response to the account creation request comprises disabling the account or limiting account access.

12. The computer implemented method of claim 11, wherein limiting account access includes at least one of requiring a response to a human interaction proof for access to the account, limiting access time to the account, limiting use of account functions, and limiting transmission from the account.

13. The computer implemented method of claim 10, wherein if the score meets predetermined criteria, the action associated with the account creation request comprises disabling the account.

14. The computer implemented method of claim 10, wherein the score is inversely proportional to the time difference.

15. The computer implemented method of claim 10, wherein the score is equal to a default value unless the time difference is less than a predetermined threshold.

16. The computer implemented method of claim 10, wherein the score is a function of the time difference and an average time difference over a predefined time period.

17. A computer system, comprising:
one or more processors;
memory; and
one or more programs, wherein the one or more programs are stored in the memory and configured to be executed by the one or more processors, the one or more programs including:

instructions for sending an account creation form including a human interaction proof to a client;
instructions for receiving the account creation form including a response to the human interaction proof from the client;
instructions for evaluating a time difference between the sending and the receiving;
instructions for associating a score, based at least in part on the time difference, with the account creation form; and
instructions for performing an action associated with the account creation form based at least in part on the score, wherein the action includes at least one of refusing the account creation form, modifying an account created in response to the account creation form, accepting the account creation form, and maintaining the account created in response to the account creation form.

18. A non-transitory computer readable storage medium and one or more computer programs embedded therein, the one or more computer programs comprising instructions, which when executed by a computer system, cause the computer system to:

send an account creation form including a human interaction proof to a client;
receive the account creation form including a response to the human interaction proof from the client;
evaluate a time difference between the sending and the receiving;
associate a score, based at least in part on the time difference, with the account creation form; and
perform an action associated with the account creation form based at least in part on the score, wherein the action includes at least one of refusing the account creation form, modifying an account created in response to the account creation form, accepting the account creation form, and maintaining the account created in response to the account creation form.

* * * * *